April 24, 1962 D. W. GARBELLANO 3,031,577
RADIATION DETECTOR
Filed May 9, 1957
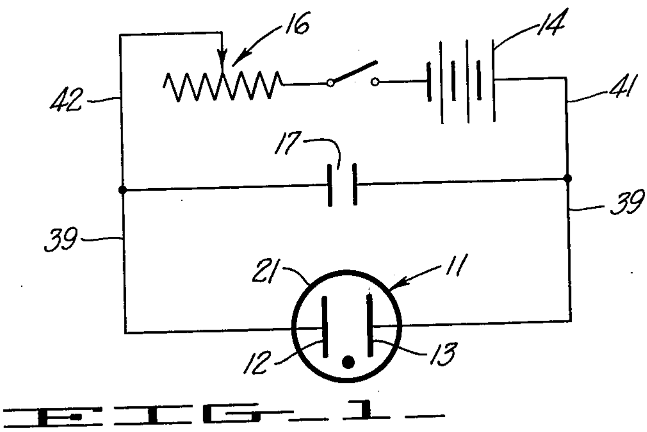
FIG_1_
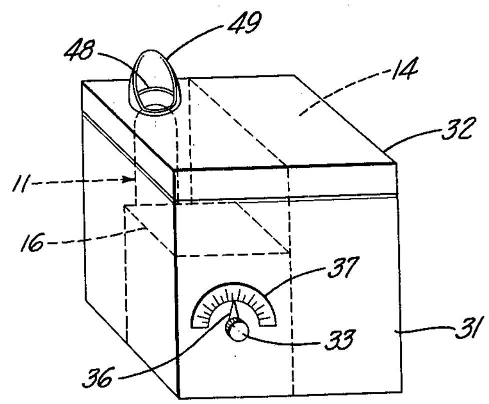
FIG_2_
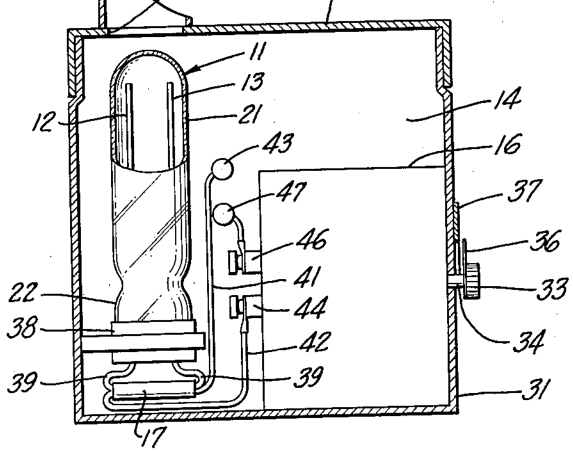
FIG_3_
INVENTOR.
David W. Garbellano
BY
William D. Hager
ATTORNEY 3,031,577
Patented Apr. 24, 1962

3,031,577

RADIATION DETECTOR

David W. Garbellano, Berkeley, Calif.
(Rte. 2, Box 1565, Grass Valley, Calif.)

Filed May 9, 1957, Ser. No. 658,039
4 Claims. (Cl. 250—83.6)

The present invention relates to a device for detecting and measuring radiation and in particular gamma rays.

With the recent emphasis upon the applications of nuclear physics there have been developed in conjunction with radiation devices, particle accelerators, and the like, various types of radiation detectors for the purpose of monitoring radiation to the end of controlling machine operation and providing health safety information. Although many known radiation detectors have been widely used, such detectors are limited in range or accuracy or are of such complexity as to reduce their applicability.

Particularly in the field of radiation health safety it is of importance to detect radiation over a wide range of intensities with accuracy and yet it is also desired that the detection means be readily portable and simple both from an operational and maintenance standpoint. The present invention provides such detection in that it is capable of detecting and indicating radiation intensity from a few roentgens per hour to several thousand roentgens per hour. Regarding the radiation detected it is known that a wide variety of atomic radiation or rays are possible, however, in devices of this type the detection of gamma radiation provides a good measure of overall radiation hazard so that the present invention is particularly adapted to measure gamma radiation.

In addition to the wide range of radiation intensities measurable by the present invention particular advantage attaches to the portability and simplicity of the device. Contrary to many detection devices which consume large amounts of electrical power so as to necessitate connection to overly large power supplies, the present invention has a low power drain and employs only reasonable voltages so that the device includes its own small power supply and is therefore readily moved about to even remote areas where no external electrical power is available. As a further requirement for any widespread use of devices of this type is an ease and simplicity of operation and maintenance whereby untrained operators may readily employ same and obtain just as satisfactory results as trained technicians. The radiation detector of this invention is substantially foolproof in operation so as to fall within the category of devices readily used by the general public without instruction or training. As to the simplicity of construction and design, here again the present invention is highly advantageous for only a minimum number of components are employed requiring no complicated equipment for aligning or setting so that construction costs are minimized and repair of damaged parts, for example, is facilitated. Because of the simplicity of construction and ruggedness of the components employed maintenance of the detector is minimized and utility thereby extended.

In distinction to so called solid type detectors wherein crystals responsive to radiation are employed, the present invention utilizes a gas that is readily ionizable by incident radiation of the type to be detected. Passage of ionizing radiation such as gamma rays through chosen gases produce ionization within gas retained between charged electrodes so that a conducting path is established and current flowing therethrough is proportional to the incident radiation. The foregoing phenomenon is herein employed together with calibrated means for controlling the rate of rise of charge or voltage impressed between the electrodes whereby such means indicate the amount of incident radiation when adjusted to maintain a predetermined pulse discharge. In order to limit the power drain from the system an intermittent gas conduction is employed herein and also by this means a reproducible ionization condition is readily achieved without metering by visual observance of the intermittent gas conduction.

It is an object of the present invention to provide a radiation detector including gas conduction means adapted for visual monitoring.

It is another object of the present invention to provide an improved gas type radiation detector.

It is a further object of the present invention to provide a gas type radiation detector having means in circuit with a gas conduction path for varying the rate of rise of voltage for setting a predetermined frequency of pulsed gas conduction in any radiation field.

It is yet another object of the present invention to provide a radiation detector employing a gas of suitable ionization potential as the detector means.

Various other advantages and possible objects of the invention will become apparent from the following description of a single preferred embodiment of the invention illustrated in the accompanying drawings and wherein:

FIGURE 1 is a circuit diagram of the invention,

FIGURE 2 is a projected view of the detector suitably housed, and

FIGURE 3 is an interior view of the detector with one side of the housing cut away.

Considering now the circuit of the present invention and referring to FIGURE 1 of the drawings there will be seen to be provided a gas tube 11 having therein a pair of electrodes 12 and 13 disposed in a gaseous atmosphere noted in some detail below and connected across a power supply 14. Inasmuch as only a small amount of power is expended in the circuit and the voltage requirements are not severe it is preferred to employ a dry cell battery for the power supply whereby weight and size is minimized and portability of the overall unit is enhanced. It is desired to supply a variable voltage to the gas tube 11 and thus a rheostat or variable resistor 16 is connected in series with the battery 14. As an additional circuit component there is provided a capacitor 17 connected across the gas tube 11 and thus also in parallel with the battery rheostat combination and serving to collect a charge from the battery and to discharge through the gas tube upon conduction of same. The foregoing elements and connections complete the circuit of the detector and it will be appreciated that the circuit is quite uncomplicated so as to require a minimum of maintenance.

Considering the gas tube 11 noted above in connection with the circuit arrangement same will be seen in FIGURE 3 to include a gas-tight housing 21 formed, for example, of glass and having a base 22 connected thereto also in gas-tight relation. Within the tube envelope 11 the two electrodes 12 and 13 are mounted upon the base 22 and are disposed in mutually spaced relationship with suitable leads or prongs extending therefrom through the base for electrical connection. Within the gas tube 11 there is maintained an atmosphere of gas that is ionizable by radiation and yet is not active. As previously noted the invention is particularly adapted to detect and measure gamma radiation. Only certain gases are suited for use in the tube 11 and among the inactive or noble gases only those gases having a relatively low ionization potential may be herein employed. As is well known, ionization of a gas results from the removal of one or more electrons from the gas atom or molecule and the ionization potential is a measure of the energy required to remove electrons from an atom or molecule. In this instance only the first ionization potential is of importance, that relating to the removal of a single electron. The choice of gas thus lies with an inactive or inert gas having a low ionization potential, for ease of gas ionization is necessary for gamma detection over a wide range of intensities. It has been found that xenon, krypton and argon are particularly well suited for use in the gas tube as the ionization potentials of these gases are 12.127, 13.996 and 15.755 respectively. Additionally neon and helium may be employed although their higher ionization potentials, 21.299 and 24.580 respectively, make them less desirable. In this respect note that another noble gas, radon, is unsuited inasmuch as it is radioactive and therefore unstable for use in this application.

Considering one physical unit embodying the invention and referring to FIGURES 2 and 3, there is provided a box housing 31 having a top or lid 32 adapted to tightly fit same in removable relation. Within this housing 31 there is disposed the battery 14 occupying, for example, one-half the housing interior and the rheostat 16 occupying, for example, one-half the remaining space. The rheostat is provided with a control knob 33 mounted upon a shaft 34 extending through the housing wall and also carrying a pointer or indicator 36. Upon the exterior of the housing about the rheostat shaft and knob there is affixed a scale 37 adapted for registry with the rheostat pointer and calibrated as noted below. Also within the housing 31 there is mounted the gas tube 11 as upon a suitable tube socket 38 that is itself fixed within the housing as by a bracket. Connected to the tube socket 38 is the capacitor 17 to be thereby connected as by leads 39 across the tube electrodes. Additional leads 41 and 42 are connected to separate ends of the capacitor and lead 41 extends into connection with one battery terminal 43 while the lead 42 is connected to a rheostat terminal 44. Electrical connections are completed by a conductor joining a second rheostat terminal 46 to a second battery terminal 47.

Operation of the present invention depends upon visual observation of the gas tube 11 and thus an opening 48 is provided in the housing as at the top thereof adjacent the tube and a hood 49 may be fixed about this opening so as to fit about the eye of an observer and exclude surrounding light when the tube is being observed.

Operation of the circuit illustrated in FIGURE 1 is fairly evident therefrom as the battery 14 charges the capacitor 17 at a rate determined by the rheostat 16 and the capacitor potential is applied directly across the gas tube 11. The passage of ionizing radiation such as gamma rays through the gas tube 11 initiates ionization therein whereby discharge occurs between the tube electrodes to drain the capacitor 17. The more radiation there is the oftener the tube will flash or discharge for any particular capacitor charging rate, for increased radiation increases gas ionization within the tube so that discharge occurs at a lower voltage, whereby a less capacitor charge is required to establish a discharge potential across the tube.

While radiation measurement may be accomplished in a variety of ways the present invention circumvents the necessity of employing a meter by utilizing and controlling the discharge or flashing rate of the gas tube as a measure of incident radiation. Discharge through the gas tube, including as it does ionization of the gas therein, produces visible light which is herein observed to identify tube discharge. For any particular radiation level and circuit conditions the gas tube will periodically discharge or flash and by varying the charging rate of the capacitor to thereby vary the rate of recovery of the gas tube voltage this rate of tube discharge may be varied.

It is herein contemplated that the detector circuit shall be initially set to produce tube discharge or flash at some predetermined frequency in the absence of any ionizing radiation. For example, the rheostat 16 may be adjusted so that the capacitor recharges at such a rate that the tube 11 flashes once a second. Subsequent placement of the detector in a position to receive or intercept radiation such as gamma rays results in the radiation passing through the tube whereby the threshold voltage thereof decreases and the tube flashes oftener. The frequency of tube discharge, with other factors constant, is proportional to the radiation passing through the tube and it is herein contemplated that the rheostat shall be operated to control the capacitor charging rate so as to return the tube discharge frequency to that in the absence of radiation. The rheostat setting change is thus a measure of the radiation passing through the tube. The change in rheostat setting may be easily determined from the registry of rheostat pointer 36 and scale 37 and this scale may be directly calibrated in radiation units and the pointer set to zero thereon in the steady circuit state wherein tube flashing occurs at a predetermined rate without radiation being present.

In use the detector of the present invention after initial setting and scale calibration may be taken into a radiation field whereupon the tube flashing rate increases owing to the radiation ionization of gas in the tube. In order to determine the radiation passing through the detector the user of the detector views the gas tube 11 through the housing aperture 48 and turns the rheostat control knob 33 until the tube flashing rate decreases to the original setting. As the increased resistance added to the circuit to return the tube to original flashing rate is proportional to the radiation passing through the tube, the radiation level may then be read directly from the calibrated scale 37 as indicated by the rheostat pointer 36.

The gas tube 11 described above is as stated filled with an inert gas having a low ionization potential and the pressure and volume of the gas together with the applied voltage all influence discharge within the tube. In one instance it has been found advantageous to employ a gas pressure of about one atmosphere with a battery voltage of 180 volts and with a wide range rheostat it has been found possible to measure gamma radiation from a few roentgen to several thousand roentgen per hour. Actually a range of tube constants is possible with a volume between 10 and 150 cubic centimeters being suitable and the upper limit being imposed only to maintain portability of the detector as larger size tubes unduly increase the size of the overall device. The pressure is preferably maintained at one atmosphere or below and a suitable voltage range is 120 to 300 volts, here again higher voltages require larger sized equipment to the detriment of portability.

There has been described above a portable radiation detector with reference to a single preferred embodiment thereof; however, it is not intended to limit the invention by described structural details and thus reference is made to the following claims for a precise definition of the scope of the invention.

What is claimed is:

1. A radiation detector comprising a gas tube enclosing spaced electrodes in an atmosphere of an inert gas having a low ionization potential, power supply means providing a charge of increasing magnitude on said electrodes which periodically increases to a value sufficient to cause periodic discharge in the tube, and means for varying the rate of increase of said charge in an amount sufficient to compensate for the intensity of ionizing radiation on the gas within the tube so as to maintain the frequency of periodic discharge in the tube at a fixed constant, said last named means being calibrated with indicia showing the intensity of the ionizing radiation on the gas within the tube while the frequency of discharge in the tube is held at said fixed constant.

2. A radiation detector as defined in claim 1 further characterized by said inert ionizable gas comprising a noble gas chosen from the group of xenon, krypton, argon, neon, and helium.

3. A radiation detector comprising a gas tube enclosing spaced electrodes in an atmosphere of an inert gas having a low ionization potential, a capacitor connected across said tube electrodes, a power supply, and a variable resistor connected in series with said power supply across said capacitor for controlling the charging rate of said capacitor, said resistor continuously adjusted to resistance values maintaining said charging rate and tube discharge frequency a constant in the presence of ionizing radiation entering said gas tube; whereby the resistance variation of said variable resistor is proportional to said ionizing radiation entering said gas tube.

4. A portable radiation detector comprising a closed tube housing spaced electrodes in an atmosphere of a gas chosen from the group of xenon, krypton, argon, neon, and helium, said tube housing being substantially impervious to light while having a shielded observation port adapted to fit about the eye of an observer and exclude light during observation; power supply means applying a voltage between said tube electrodes for establishing a constant frequency pulsed discharge therebetween observed through the port as flashes within the tube housing, and calibrated means for varying said power supply output to maintain said predetermined tube discharge frequency in the presence of ionizing radiation whereby the calibrations of said latter means are proportional to said radiation.

References Cited in the file of this patent

UNITED STATES PATENTS

| | | |
|---|---|---|
| 1,821,698 | Fisher | Sept. 1, 1931 |
| 1,832,402 | Langer | Nov. 17, 1931 |
| 1,876,109 | Van Der Pol | Sept. 6, 1932 |
| 2,000,425 | Strauss | May 7, 1935 |
| 2,496,886 | Molloy et al. | Feb. 7, 1950 |
| 2,728,004 | Victoreen | Dec. 20, 1955 |
| 2,760,080 | Robinson | Aug. 21, 1956 |
| 2,839,688 | Anton | June 17, 1958 |

FOREIGN PATENTS

| | | |
|---|---|---|
| 326,624 | Great Britain | Mar. 20, 1930 |